United States Patent [19]

Matthews et al.

[11] 4,247,439
[45] Jan. 27, 1981

[54] WATER-BORNE COATING COMPOSITION MADE FROM EPOXY RESIN, POLYMERIC ACID AND TERTIARY AMINE

[75] Inventors: James F. Matthews, Levittown; Eugene G. Sommerfeld, Penn Valley, both of Pa.

[73] Assignee: E. I. Du Pont de Nemours and Company, Wilmington, Del.

[21] Appl. No.: 74,122

[22] Filed: Sep. 14, 1979

Related U.S. Application Data

[63] Continuation-in-part of Ser. No. 941,540, Sep. 15, 1978, abandoned, which is a continuation-in-part of Ser. No. 767,388, Feb. 10, 1977, abandoned, which is a continuation-in-part of Ser. No. 581,094, May 27, 1975, abandoned, which is a continuation-in-part of Ser. No. 413,372, Nov. 6, 1973, abandoned.

[51] Int. Cl.$^3$ .............................................. C08L 33/00
[52] U.S. Cl. ................... 260/29.6 NR; 260/29.6 TA; 260/29.6 H; 260/29.6 HN; 260/29.6 WA
[58] Field of Search .............. 260/29.6 NR, 29.4 WA, 260/29.6 TA, 29.6 H, 29.6 HN

[56] References Cited

U.S. PATENT DOCUMENTS

| 2,676,166 | 4/1954 | Webers | 526/79 |
|---|---|---|---|
| 2,895,930 | 7/1959 | Yuseum | 260/21 |
| 2,991,260 | 7/1961 | Auen et al. | 260/22 |
| 3,331,805 | 7/1967 | Mandel | 260/834 |
| 3,338,860 | 8/1967 | Vasta | 260/834 |
| 3,403,088 | 9/1968 | Hart | 204/181 |
| 3,419,525 | 12/1968 | Aelony | 260/37 R |
| 3,468,816 | 9/1969 | Thompson et al. | 260/18 R |
| 3,845,066 | 10/1974 | Vasta | 260/29.6 WB |
| 3,908,049 | 9/1975 | Fitko | 260/29.4 UA |
| 3,943,187 | 3/1976 | Wu | 260/29.6 NR |
| 3,962,165 | 6/1976 | Bosso et al. | 260/29.2 EP |
| 3,969,300 | 7/1976 | Nagata et al. | 260/29.4 UA |
| 3,997,694 | 12/1976 | Wu | 428/35 |
| 4,021,396 | 5/1977 | Wu | 260/29.6 NR |
| 4,069,210 | 1/1978 | Schimmel | 260/29.2 EP |
| 4,126,596 | 11/1978 | Schimmel et al. | 260/29.6 NR |

FOREIGN PATENT DOCUMENTS

| 804928 | 1/1974 | Belgium. | |
| 732653 | 4/1966 | Canada | 260/29.6 NR |
| 921622 | 3/1963 | United Kingdom. | |

Primary Examiner—Maurice J. Welsh

[57] ABSTRACT

Water-borne reaction products of (a) carboxyl-functional polymers; (b) polyepoxides; and (c) tertiary amines are useful as film-forming components of coating compositions which can be spray-, flow-, dip-, roller-, or electro-coated. The coating compositions are useful as such or can be crosslinked with crosslinking agents such as a nitrogen resin and, when coated on metal and paper substrates, they provide coatings of improved properties, including a high degree of flexibility during machining and stamping of the coated articles, corrosion resistance, gloss, hydrolytic stability, and nonadulterating of foods and beverages in contact therewith.

41 Claims, No Drawings

WATER-BORNE COATING COMPOSITION MADE FROM EPOXY RESIN, POLYMERIC ACID AND TERTIARY AMINE

CROSS-REFERENCE TO RELATED APPLICATIONS

This is a continuation-in-part of application Ser. No. 941,540, filed Sept. 15, 1978, being abandoned Sept. 15, 1979, which in turn is a continuation-in-part of application Ser. No. 767,388, filed Feb. 10, 1977 and abandoned Sept. 15, 1978, which in turn is a continuation-in-part of application Ser. No. 581,094, filed May 27, 1975 and abandoned Feb. 11, 1977, which in turn is a continuation-in-part of application Ser. No. 413,372, filed Nov. 6, 1973 and abandoned Tuesday, May 27, 1975.

BACKGROUND OF THE INVENTION

This invention relates to coating compositions based on a water-borne reaction product of a carboxyl-functional polymer, an epoxide, and a tertiary amine, having general utility in coating metallic and paper substrates. It is more particularly directed to coating compositions useful as automotive and can coatings.

Coatings of the prior art are often dissolved or dispersed in organic solvents. Among commonly utilized thermosetting compositions are those based on epoxy resins crosslinked with nitrogen resins, usually in an acid catalyzed process.

Increased awareness of the environmental hazards of allowing organic solvent vapors to enter the atmosphere, the desirability of a single system that can be applied not only by the more conventional techniques of spray, roller or flow coating but also by electrodeposition, and the economy resulting from the substitution of water for some or all of the solvents in a coating composition, are all factors mitigating in favor of water-borne coating compositions.

Aqueous epoxy-acrylic-amine coating compositions of other investigators, including U.S. Pat. Nos. 3,969,300—Nagata (1976) and 4,021,396—Wu (1977) are less stable than desired or lack advantages of the present invention.

The composition of this invention is an aqueous solution or dispersion of the reaction product of a carboxyl-functional polymer, a terminally functional epoxy resin, and a tertiary amine. Such a water-borne system can optionally contain a crosslinking agent, is stable, and can be applied to metallic substrates by spray, roller, dip or flow coating or by electrodeposition at the anode and to paper.

SUMMARY OF THE INVENTION

According to the present invention, there is provided a water-borne coating composition based on polymeric quaternary salts of polymeric acids which are the reaction product of:

(A) not less than 50%, based on the weight of (A) plus (B), preferably not less than 65%, most preferably about 78%, of an epoxy resin containing, on the average, two terminal 1,2-epoxy groups per molecule and having an epoxy equivalent weight of 750–5000, preferably about 1500–4000, most preferably about 3000;

(B) a carboxyl-functional polymer in an amount sufficient to provide at least 1.25, preferably at least about 1.75, most preferably about 4.6, equivalents of carboxyl groups, when the source of the carboxyl group is a mono-protic acid, and at least 2.0 equivalents of carboxyl groups, when the source of such groups is a diprotic acid, per equivalent of 1,2-epoxy groups in the epoxy resin of (A), said polymer having a weight average molecular weight (determined by light scattering) of 10,000–160,000, preferably about 10,000–80,000, most preferably about 13,000–18,000, and an acid number of 100–500, preferably about 150–350, most preferably about 300; and (C) an aqueous solution of at least 1.25, preferably at least about 1.75, most preferably about 3.0, equivalents of a tertiary amine per equivalent of 1,2-epoxy groups in the epoxy resin of (A), said tertiary amine being selected from the group consisting of $R_1R_2R_3N$, pyridine, N-methyl pyrrole, N-methyl piperidine, N-methyl pyrrolidine, N-methyl morpholine, and mixtures therein and wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms; and (D) optionally, 10–90% of the amount required for stoichiometric reaction with the carboxylfunctional polymer of (B) of at least one primary, secondary or tertiary amine or monofunctional quaternary ammonium hydroxide, wherein Y is at least about $6+0.75(2^X)$ wherein Y is the milliequivalent of carboxyl groups neutralized by primary, secondary or tertiary amine or monofunctional quaternary ammonium hydroxide per 100 grams of acid polymer plus epoxy, and X is the epoxy equivalent weight divided by 1000; and wherein for increasing ratios of carboxyl groups to 1,2-epoxy groups, the amount of amine is increased to keep the carboxyl-functional polymer water dispersible. Preferably, components (A), (B) and (C) are capable of forming a hydrogel structure with components (A), (B) and (C) comprising about 0.1–50% of the coating composition and the remainder comprising water and, optionally, organic liquid(s) in a volume ratio of from 70:30 to all water, sometimes preferably 80:20. (Percentages, proportions and ratios herein are by weight except where indicated otherwise.)

The water-borne coating composition can be crosslinked without the addition of a crosslinking agent or, optionally, it can contain crosslinking agents such as a nitrogen resin or a phenolic resin, as well as additives commonly utilized in coating compositions such as pigments, fillers, UV absorbers, and the like.

DESCRIPTION OF THE INVENTION

The water-borne coating composition of the invention is a solution or dispersion of the reaction products of an epoxy resin, a tertiary amine, and a carboxyl-functional polymer. By mixing these components in a random order and utilizing aqueous solutions of highly specific tertiary amines such as dimethyl ethanol amine, a stable, water soluble or dispersible salt of a polymeric quaternary ammonium hydroxide and a carboxyl-functional polymer results which can be crosslinked without the addition of external crosslinking agents. The optional addition of an external crosslinking agent, such as a nitrogen resin, also affords a crosslinkable solution or dispersion which is stable at room temperature. Both compositions, the salt and the solution or dispersion containing an external crosslinking agent, are infinitely dilutable with water.

Whether the coating composition is a solution or a dispersion is largely dependent on the nature of the particular amine used, the stoichiometry of the system, and the epoxy equivalent weight. Even when the composition is opaque some of the resinous components may be dissolved, and when the composition appears to be a clear solution it is possible that small amounts of the components are in a dispersed state. For sake of simplicity, hereafter the term "dispersion" will be used to denote the water-borne coating composition.

The dispersion, with or without an external crosslinking agent, as prepared, usually has a pH of above 7 and a nonvolatile content of up to 50%. Upon drying, a hard, solvent-resistant film having excellent resistance to acids, bases, hot water, and detergent results.

The low molecular weight epoxy resins to be utilized in the present invention are commonly known in the art. One class of such resins has the generalized formula

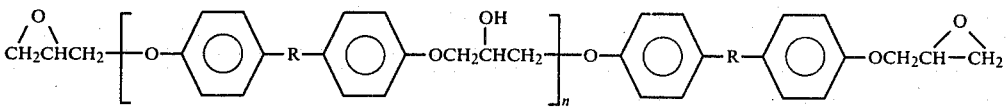

wherein R is an alkylene group of 1-4 carbon atoms and n is an integer from 1-12. The epoxy resins utilized in this invention contain an average of two terminal 1,2-epoxy groups per molecule and are in the epoxy equivalent weight range of 750-5000, preferably 1500-4000. They can also contain substituted aromatic rings.

One such preferred epoxy resin is "Epon 1004" where R is isopropylidene, the average value of n is 5, having an epoxy equivalent weight of 875-1025, with an average of about 950±50. The epoxy equivalent weight is defined as the grams of resin containing 1 gram-equivalent of epoxide as measured by ASTM-D-1652. The coating composition containing "Epon 1004" affords a glossy, flexible, chemically-resistant film. Another preferred epoxy resin is "Epon 1007" where R is isopropylidene, the average value of n is 11, having an epoxy equivalent weight of 2000-2500, with an average of about 2175±50. The coating composition containing "Epon 1007" affords glossy, tough, flexible films upon cure. Another preferred epoxy is an analog of "Epon 1009" with an average epoxy eqivalent weight of 3000 made by chain extending "Epon 829" (EW 195) with bisphenol A.

The quantity of the epoxy resin to be utilized in the coating composition of this invention is determined in relation to the amount of carboxyl-functional polymer and the relative amounts are dependent on the end use application of the coating but there must be at least 50%, preferably in the range of 65-90%, of epoxy resin present. There must be, furthermore, at least 1.25, preferably at least 1.75, and most preferably about 4.6, equivalents of carboxyl groups per equivalent of 1,2-epoxy groups in the epoxy resin. This minimum equivalent requirement is valid for those carboxyl-functional polymers which contain monoprotic acids derived from alpha,beta-ethylenically unsaturated acid monomers such as acrylic acid, methacrylic acid, monoesters of alkanols having 1-8 carbon atoms with diacids, such as maleic acid, itaconic acid, fumaric acid, mesaconic acid, citraconic acid and the like, and mixtures thereof. For those carboxyl-functional polymers which contain diprotic acids derived from diacids such as maleic acid, itaconic acid, fumaric acid, mesaconic acid, citraconic acid, and mixtures thereof, the minimum requirement is 2.0 equivalents, preferably at least 2.5 equivalents, of carboxyl group per 1,2-epoxy groups. Usually, no more than 10.0, and preferably no more than 6.0, equivalents of carboxyl groups, per equivalent of 1,2-epoxy groups, will be present.

The carboxyl-functional polymers utilized in this invention are prepared by conventional free radical polymerization techniques from at least one ethylenically unsaturated monomer and at least one ethylenically unsaturated acid monomer. The choice of the alpha,beta-unsaturated monomer(s) is dictated by the intended end use of the coating composition and is practically unlimited. A variety of acid monomers can be used; their selection is dependent on the desired final polymer properties.

This acid monomer can be an ethylenically unsaturated acid, mono-protic or diprotic, anhydride or monoester of a dibasic acid, which is copolymerizable with the other monomer(s) used to prepare the polymer.

Illustrative monobasic acids are those represented by the structure

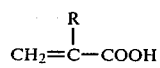

where R is hydrogen or an alkyl radical of 1-6 carbon atoms.

Suitable dibasic acids are those represented by the formula

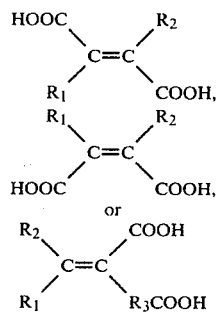

where $R_1$ and $R_2$ are hydrogen, an alkyl radical of 1-8 carbon atoms, halogen, cycloalkyl of 3-7 carbon atoms or phenyl, and $R_3$ is an alkylene radical of 1-6 carbon atoms. Half-esters of these acids with alkanols of 1-8 carbon atoms are also suitable.

The most preferred acid monomers are acrylic acid, methacrylic acid, and itaconic acid.

The acid number of the polymers is 100-500, which corresponds to concentrations of about 10-77% of the acid monomers by weight of the polymer. The acid number is the number of miligrams of potassium hydroxide required to neutralize one gram of the polymer. For purposes of illustration, an acid number of 100 corresponds to the presence in the polymer of either 12.8% acrylic acid, 15.3% of methacrylic acid, 11.5% of itaconic acid, or 10.3% of maleic or fumaric acid. An acid number of 500 corresponds to 64% of acrylic acid, 76.5% of methacrylic acid, 57.5% of itaconic acid, or 51.5% of maleic or fumaric acid in the polymer. Preferred acid number values are 150–350.

Vinyl aromatic monomers are commonly utilized to be copolymerized with the acid monomers. They are represented by the structure:

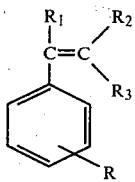

where R, $R_1$, $R_2$, and $R_3$ are hydrogen or an alkyl radical of 1–5 carbon atoms. Illustrative of these monomers are styrene, α-methyl styrene, vinyl toluene, and the like. The best polymers, in terms of final film properties, are those in which this type of monomer is styrene. The vinyl aromatic monomers can be present from 0–80% of the carboxyl-functional polymer, preferably from 40–80%, most preferably from 40–70%, and specifically at concentrations of about 42, 53, and 66%. For some purposes 10–45% may be preferred and, in some applications, the polymer contains no such monomer.

Other commonly utilized monomers are the α,β-unsaturated nitriles represented by the structure:

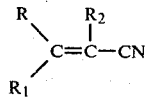

where R and $R_1$ are hydrogen, an alkyl radical of 1–18 carbon atoms, tolyl, benzyl or phenyl, and $R_2$ is hydrogen or methyl. Most commonly utilized are acrylonitrile and methacrylonitrile. The nitrile monomer can be present from 0–40% based on the carboxyl-functional polymer. The polymers preferably contain 10–30% and more preferably 18–22% of the polymer, of the nitrile monomer. For certain purposes it may be desirable to use 5–10% of the nitrile monomer and in some cases no such monomer is included in the polymers.

Other suitable monomers are esters of acrylic acid, methacrylic acid or mixtures thereof with $C_1$–$C_{16}$ alkanols. Preferred esters are the methyl, ethyl, propyl, n-butyl isobutyl, and 2-ethylhexyl esters of acrylic acid or methacrylic acid or mixtures of such esters. These esters can be present in concentrations of 0–97%, preferably 50–90% for automotive finishes and coil coatings and, for can coatings and appliance finishes, preferably 0–50%.

One can also utilize hydroxyalkyl (meth)acrylate monomers such as hydroxyethyl acrylate, hydroxypropyl acrylate, hydroxyethyl methacrylate, hydroxypropyl methacrylate or mixtures thereof. Up to 20% of such ester(s) can be incorporated.

It may be desirable, for certain uses, to include in the polymer acrylamide, methacrylamide or an N-alkoxymethyl (meth)acrylamide such as N-isobutoxymethyl (meth)acrylamide. Alternatively, a polymer containing copolymerized acrylamide or methacrylamide can be post-reacted with formaldehyde and an alkanol to produce an N-alkoxymethylated polymer.

Choice of the particular monomers to be utilized is made with respect to the end use of the coating composition. Preferred polymer compositions include: styrene/acrylonitrile/α,β-ethylenically unsaturated acid//45-84/10-30/15-54, for can coating; styrene/acrylonitrile/alkyl (meth) acrylate/α,β-ethylenically unsaturated acid//30-60/10-30/10-50/15-54, for can coatings and applicance finishes; styrene/alkyl (meth)acrylate/α,β-ethylenically unsaturated acid//20-70/10-60/15-54 or, even more preferably, 35-60/30-50/15-54, for automotive topcoats and primers; methyl methacrylate/alkyl (meth)acrylate/α,β-ethylenically unsaturated acid//20-40/30-74/15-54, for automotive and coil coating applications. Any of the above can also include hydroxyalkyl (meth)acrylate and/or (meth)acrylamide. The alkyl group of the alkyl (meth)acrylate monomer is preferably ethyl, n-butyl, iso-butyl or 2-ethylhexyl.

The carboxyl-functional polymers can be prepared by polymerizing suitable monomers, in proper amounts, in an organic liquid medium. In general, this liquid is an organic liquid capable of medium hydrogen bonding, or a combination of this liquid with less than about 50% of an organic liquid capable of strong hydrogen bonding.

Preferably, the liquid medium for the polymerization is an alcohol mixture, generally 62% butanol and 38% of butyl cellosolve. Other media which could be used include either water-soluble or insoluble ketone. Optionally, the ketone can also contain less than about 50% of an ethylene glycol- or diethylene glycol monoalkyl ether (where the alkyl group contains 1–4 carbon atoms), or diacetone alcohol, and/or an alkanol of 1–4 carbon atoms or an alkanediol of 1–7 carbon atoms. A preferred medium is methyl ethyl ketone used by itself. Another preferred medium for the polymerization is a mixture of methyl ethyl ketone and ethylene glycol monobutyl ether.

A catalyst or polymerization initiator is ordinarily used in the polymerization of the carboxylfunctional polymers, in the usual amounts. This can be any free radical initiator that decomposes with a halflife of 0.5 to 2.5 hours at the reflux temperature of the organic liquid medium being used. Tertiary butyl perbenzoate, tertiary butyl peroxypivalate, and tertiary butyl peroxyisobutyrate are preferred.

The polymers utilized in the water-borne coating composition of this invention have a weight average molecular weight, as determined by light scattering or, more conveniently, gel permeation chromatography, using a polystyrene standard, calibrated by light scattering methods of about 10,000–160,000. The preferred weight average molecular weight range is 10,000–80,000. For some applications a 13,000–18,000 molecular weight is preferred.

During the preparation of the coating composition of this invention, an aqueous solution of a tertiary amine, specified below, is brought in contact with a solution of an epoxy resin in organic liquid(s) or with a solutin of an epoxy resin and a carboxyl-functional polymer. A wide variety of organic liquids can be used to dissolve the epoxy resins and the carboxyl-functional polymers. Among the most commonly used solvents are alcohols such as isopropanol, the butyl alcohols, 2-hydroxy-4-methyl-pentane, 2-ethylhexyl alcohol, cyclohexanol, glycols such as ethylene glycol, diethylene glycol, 1,3-butylene glycol, ether alcohols such as ethylene glycol mono-ethyl ether, ethylene glycol mono-butyl ether, diethylene glycol mono-methyl ether, mixtures thereof, and many aliphatic and aromatic hydrocarbons if used admixed with at least one of the above.

While the exact mode of the reaction is not fully understood, it is believed that the tertiary amine first reacts with the carboxyl-functional polymer to form the corresponding salt which, in turn, can dissociate to allow the amine to react with the 1,2-epoxy groups of the epoxy resin. It is also possible, however, that the tertiary amine reacts directly with the 1,2-epoxy groups. In either case, the resulting quaternary ammonium hydroxide can react with the carboxyl-functional polymer to yield a polymeric quaternary ammonium-amine mixed salt of a polymeric acid.

The reaction of tertiary amines with materials containing epoxy groups, to yield adducts containing quaternary ammonium groups, is known. Such reaction, when carried out in presence of water, can afford a product that contains both a hydroxyl group and a quaternary ammonium hydroxide. The reaction can be represented schematically as follows:

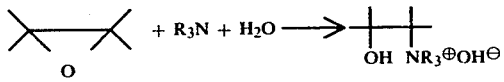

While most tertiary amines react with epoxy resins to form quaternary ammonium hydroxides, the preparation of the water-borne coating composition of this invention is carried out utilizing at least one tertiary amino selected from the group: $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms. Some examples of $R_1R_2R_3N$ are: trimethyl amine, dimethyl ethanol amine (also known as dimethyl amino ethanol), methyl diethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, and mixtures thereof. Most preferably trimethyl amine or dimethyl ethanol amine is used.

The generation of a polymeric quaternary ammonium hydroxide which is water soluble or dispersible when in presence of a nitrogen resin crosslinking agent is described in U.S. Pat. No. 4,076,676, granted Feb. 28, 1978, and its relevant portions are hereby incorporated by reference.

The amount of tertiary amine needed in the preparation of the water-borne coating composition of this invention is determined by two factors. As a minimum, there is required at least 1.25 equivalents of tertiary amine per equivalent of 1,2-epoxy groups, preferably at least 1.75 equivalents, more preferably 3.0, for the formation of stable dispersions. As the ratio of the number of carboxyl groups in the carboxyl-functional polymer to the number of 1,2-epoxy groups in the epoxy resin increases, the amount of amine is also increased to keep the carboxyl-functional polymer water dispersible. This excess amine is believed to form a salt with some or all of the excess carboxyl groups of the polymer. It is preferred that no excess amine, over the total number of equivalents of carboxyl groups, be used in the coating composition of this invention. The amine utilized in excess of the 1.25 equivalents of the highly specific tertiary amine per equivalent of 1,2-epoxy groups need not be the same as, nor does it necessarily have to be selected from the group of, the highly specific tertiary amines. Any primary, secondary of tertiary amine or monofunctional quaternary ammonium hydroxide can be utilized in neutralizing carboxyl groups of the carboxyl-functional polymer which are not already neutralized. Among such tertiary amines are included: triethyl amine, diethyl ethanol amine, dimethyl cyclohexyl amine, triethanol amine, tributyl amine, dimethyl n-butyl amine, tripropyl amine, dimethyl lauryl amine, and γ-picoline. Primary and secondary amines preferably should not be used along with tertiary amines in the neutralization of the epoxies because unwanted covalent bonds could be formed, and this can interfere with the desired hydrogel formation.

The water-borne coating composition of this invention can be prepared without regard to the sequence of addition of the various components. It is preferred, however, to first dissolve the epoxy resin in the carboxyl-functional polymer, in presence of suitable organic liquids. Addition of a suitable tertiary amine, usually dissolved in water, completes the preparation of the polymeric quaternary ammonium salt of a polymeric acid. Additional water can then be added to achieve the final volume rate of water and organic liquid of from 70:30 preferably to 90:10. Additional amine can also be added to insure dispersibility.

A preferred ratio of tertiary amine to water is approximately 1:5 by weight.

The reaction can be carried out between room temperature and below the boiling point of the reaction medium, preferably between 50°–100° C., most preferably 90°–100° C. In this temperature range there is a rapid rate of reaction.

In another preferred method of preparation of the coating composition, an epoxy resin is dissolved in a suitable organic liquid such as the mono-butyl ether of ethylene glycol or diethylene glycol, followed by the addition of a suitable tertiary amine. After the formation of the polymeric quaternary ammonium hydroxide is substantially complete, a carboxyl-functional polymer, dissolved in a suitable organic liquid is mixed with it with agitation. This latter solution can also contain any additional primary, secondary or tertiary amine, dissolved in water, necessary for dispersability of the coating composition. Mixing of the components completes the preparation of the water-borne coating composition. This sequence of steps can also be carried out between room temperature and temperatures below the boiling point of the reaction media.

Yet another preferred method of preparation comprises the steps of dissolving the carboxyl-functional polymer in a suitable organic liquid, addition of an aqueous solution of a suitable tertiary amine, mixing in of an epoxy resin, and heating, preferably between 50°–100° C. and, more preferably, between 90°–100° C., followed by the requisite amount of water to obtain the final water-to-organic liquid volume ratio of from 70:30 to 90:10.

The polymeric quaternary ammonium-amine mixed salt of the carboxyl-functional polymer of the water-borne coating composition of this invention preferably is a complex hydrogel structure. It is the generation, during the epoxy/carboxyl/amine reaction, of such a hydrogel structure which affords the solubility or dispersibility, and stabilization, in water of the coating composition. A possible schematic formula is shown by the formula below. The exact nature of the bonding is not known. The number of carboxyl groups in the schematically shown polymer molecules and of the relative portion of free acid groups to the amine salt groups are determined by the stoichiometry employed during the preparation of the coating composition. The schematic representation is shown to further the understanding of the nature of the invention:

hexaethoxymethylmelamine, hexamethoxymethylmelamine, dimethoxytetraethoxymethylmelamine, dibutoxytetramethoxymethylmelamine, butylated benzoguanamine, partially methylated urea, fully methylated urea, fully butylated urea hexabutoxymethylmelamine, and mixtures thereof.

These nitrogen resins can be blended directly into the coating composition at the completion of the preparation or before final dilution with water, either as a solid or as a solution in some miscible organic liquid.

The nitrogen resins are ordinarily added to the com-

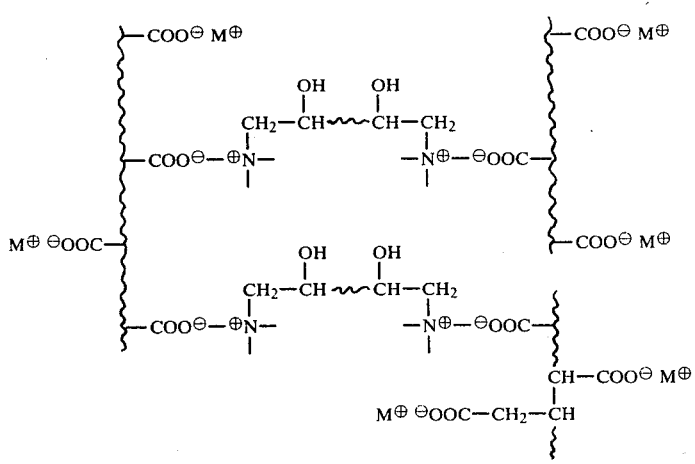

where $M^{\oplus}$ is hydrogen or a protonated primary, secondary or tertiary amine or a monofunctional quaternary ammonium group and

is formed from a tertiary amine selected from the group: $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms.

The water-borne coating composition of this invention is a stable solution or dispersion and can be used as prepared. It can be crosslinked without the addition of an external crosslinking agent and can also be crosslinked with external crosslinking agent such as phenol formaldehyde resins or, preferably, nitrogen resins.

The nitrogen resins are well known. They are the alkylated products of amino-resins prepared by the condensations of at least one aldehyde with at least one of urea, N,N'-ethyleneurea, dicyandiamide, and aminotriazines such as melamines and guanamines. Among the aldehydes that are suitable are formaldehyde, revertible polymers thereof such as paraformaldehyde, acetaldehyde, crotonaldehyde, and acrolein. Preferred are formaldehyde and revertible polymers thereof. The amino-resins are alkylated with at least one and up to and including six alkanol molecules containing 1–6 carbon atoms. The alkanols can be straight chain, branched or cyclic.

Among the preferred nitrogen resins are partially methylated melamines, partially butylated melamines, positions of the invention at concentrations ranging from 5 to 35%, preferably 8 to 20%, even more preferably 10 to 15%. The exact amount will be dictated primarily by the final properties desired of the composition and can be determined by one skilled in this art.

In the claims, the term "consisting essentially of" means not including other ingredients in amounts which change the basic and novel characteristics of the invention, including providing an aqueous acid-polymer-modified epoxy coating composition that can form a hydrogel and is useful as an interior coating for cans. Other commonly utilized additives such as coalescing aids, flow-control agents, pigments and the like can be added, in the usual amounts, if this appears necessary or desirable.

The water-borne composition can be applied by a variety of techniques and to a variety of substrates known in industry. For example, the coating composition of this invention can be utilized in the can manufacturing industry which utilizes mainly metallic cans, many of them cylindrical, made from aluminum, tin-free steel, electrolytic tin-plate, and quality-as-rolled steel, among others. Cans utilized for packaging and shipping food and beer or other beverages are mostly of the three-piece or the two-piece drawn-and-ironed (D and I) variety. Cans constructed from three pieces (body, top and bottom) can be roller coated before the metallic sheet is formed into the body of the can or can be spray coated after partial fabrication. The D and I cans, where the metal sheet is stamped to form a cylindrical body closed at one end, are generally spray coated.

The coating composition of this invention can also be applied by electrodeposition. In the electrodeposition process the water-borne composition is placed in contact with an electrically conductive cathode and an electrically conductive anode, with the surface to be coated being the anode. During the process an adherent film is deposited at the anode. The substantial lack of film formation at the cathode is thought to be due to the preferential dissociation of the amine salt of the carboxyl groups over the polymeric quaternary ammonium salt of the carboxyl groups. It is believed that both electronic and steric factors are involved in the control of the dissociation. The negatively charged carboxylate anion migrates to the anode. The nitrogen resin crosslinking agent, if present in the coating composition, also migrates, in a possible physical entanglement with the polymeric quaternary ammonium salt of the carboxyl-functional polymer, to the anode.

The conditions under which the electrocoating is carried out are similar to those used in the electrodeposition of other types of coatings. The applied voltage can be varied, can range from 1 to 1000 volts, and is typically between 25 and 500 volts. The current density is usually between about 1 milliampere and 100 milliamperes per square centimeter. The current density tends to decrease during the coating process as the coating thickness increases. The coating time can vary from 1 to 20 seconds or longer and is typically between 1 and 5 seconds for coating cans.

The concentration of the coating composition depends upon the process parameters to be used and is not generally critical. Ordinarily the film-forming components comprise 0.1-50% and preferably 5-30%, for conventional coating methods, and 1-20%, for electrodeposition, of the total composition, the remainder being water and organic liquid(s). The latter are present in a volume ratio of from 90:10 preferably to 70:30.

The freshly deposited films are capable of being immediately dried and/or crosslinked, without regard to the method of coating used to obtain them.

The coating compositions of this invention can be dried to useful films as is or can be cured thermally as is or when containing, for example, a nitrogen resin crosslinking agent. After the composition has been applied to the substrate, baking at elevated temperatures brings about the desired crosslinking. Temperatures of 150° C. to 260° C., for 0.1 to 30 minutes, are typical baking schedules utilized.

The water-borne coating composition of this invention is useful in a variety of applications. This coating composition finds particular utility in the can industry where the composition can be applied to the interior of two-piece drawn-and-iron and three-piece beer and beverage cans, to the exterior of three-piece beer and beverage cans, to the interior and/or exterior ends of two- or three-piece cans or two- or three-piece sanitary cans. When the coating composition of this invention is applied to the interior of food and beer or beverage cans by spray-coating, a thin uniform film is deposited which, after curing, corresponds to a coating weight of 0.3 to 1.3 milligrams per square centimeter (2-8 milligrams per square inch). Coatings utilized as an interior enamel have excellent taste and odor characteristics, that is to say, low extractables and sorption to prevent taste adulteration.

The water-borne composition also has utility, expecially when crosslinked with a nitrogen resin, in automotive primer, appliance finish, and coil coating applications, the final coated articles having especially desirable hardness and acid, base, solvent, and detergent resistance properties. The cured coatings are also resistant to salt spray and "processing." This latter property is tested in a steam-pressure cooker at approximately 120° C.

The invention is further illustrated by the following examples.

EXAMPLE 1

(A)

A polymer having the composition of styrene/ethyl acrylate/methacrylic acid//34.7/40/25.3 (percent by weight) is prepared similarly to the method of preparation used for the polymer of Example 3(A). The final polymer has an acid number of 164 and a solids content of 55%.

(B)

To a 457.9-gram portion of the polymer from (A) above, are added 666.6 grams of "Epon 1007" (average epoxy equivalent weight about 2,175); butyl cellosolve, 81.5 grams; and butyl carbitol, 81.5 grams. The mixture is heated to between 80°-100° C. and mixed to dissolve the epoxy resin. A solution of 65.9 grams of dimethylamino ethanol in 131.8 grams of water is then added and the reaction mixture is maintained at 75°-80° C. for 30 minutes. To this mixture is then added a fully alkoxylated methoxybutoxymethyl melamine, 181.5 grams, followed by, after mixing for 5 minutes, 2333.1 grams of water. The mix is stirred at 50°-60° C. until uniform. A stable dispersion is obtained having a solids content of 27.5% and a pH of 9.0.

The resulting product contained about 72.6% epoxy resin, 27.4% acrylic resin, by weight, and the equivalent ratios of acid polymer/amine/epoxy was about 2.4/2.4/1. X was 2.175, and Y was 47.

The product is applied to untreated aluminum with a #25 wire-wound rod and baked at 205° C. to afford a coating weight of 25.9 mg/4 square-inch surface. Comparison test data, with product from (C) below, are shown in (D) below.

(C)

Example 1(B) is repeated with the exception that no external crosslinking agent is utilized. The following quantities are added in the same manner as in (B) above:

|  | Grams |
| --- | --- |
| Polymer [from (A) above] | 548.4 |
| "Epon 1007" | 798.4 |
| Butyl Cellosolve | 54.6 |
| Butyl Carbitol | 54.6 |
| Dimethyl Ethanol Amine | 79.0 |
| Water (for the amine) | 157.9 |
| Water | 2307.1 |

The stable dispersion so obtained has a solids content of 27.5% and a pH of 9.0. This is applied to untreated aluminum as above and baked to afford a coating weight of 25.1 mg/4 square inch. Test data are shown in (D) below.

(D)

The coated panels from (B) and (C) above are tested as follows: The hard, glossy films from both (B) and (C) pass 40 rubs with methyl ethyl ketone and show no blush and excellent adhesion after a 30-minute exposure to boiling water.

These results indicate that good film properties can be obtained with this invention in presence or absence of an external crosslinking agent.

EXAMPLE 2

(A)

To a suitable reactor is charged the following parts by weight:

| | |
|---|---|
| Styrene | 83.318 |
| Ethyl Acrylate | 78.868 |
| Methacrylic Acid | 71.850 |
| Acetone | 35.226 |
| Monobutyl Ether of Ethylene Glycol | 81.076 |
| Normal Butanol | 28.518 |

The charge is heated to 85° C. and the heat is turned off. A solution of 1.403 parts of tertiary butyl peroxy isobutyrate in 2.349 parts of monobutyl ether of ethylene glycol is added and the batch exotherms to reflux temperature and is held there for ninety minutes. A second addition of 1.403 parts of tertiary butyl peroxy isobutyrate in 2.349 parts of monobutyl ether of ethylene glycol is added rapidly and reflux is maintained for an additional 60 minutes. A third addition of 1.403 parts of tertiary butyl peroxy isobutyrate in 2.349 parts of monobutyl ether of ethylene glycol is added rapidly and reflux is maintained for an additional 60 minutes. 69.890 parts of normal butyl alcohol and 43.611 parts of monobutyl ether of ethylene glycol are added. 35.226 parts of acetone is removed by distillation. 54.373 parts of diemethylethanol amine and 326.240 parts of deionized water are added. The acid number of the product is 200.

(B)

To a suitable reactor is charged the following parts by weight:
"Epon 829": 1854.6
Bisphenol A: 985.4
Monobutyl Ether of Ethylene Glycol: 424.8

The charge is heated to 130°–140° C. and allowed to exotherm to about 200° C. Temperature is maintained above 165° C. for two hours after peak exotherm temperature is reached. 778.7 Parts of normal butanol are added.

The "Epon 829" has an epoxy equivalent weight of about 195, and it is chain-extended by the bisphenol A to an epoxy equivalent weight of about 3000.

The batch is cooled to 100° C. 2358.8 Parts of the neutralized acrylic polymer prepared in A are added. The batch is maintained at 80°–85° C. for 25 minutes. 5597.7 Parts of deionized water, preheated to 80° C. are added evenly over a 1 hour period, and the batch is mixed an additional 30 minutes.

The resulting product contained about 81% epoxy resin and 19% acrylic resin, by weight, with an equivalent ratio of acid polymer/amine/epoxy of about 2.5/1.8/1. X was 3, and Y was 22.5.

EXAMPLE 3

Into a suitably equipped kettle, inerted with nitrogen, are added the following parts by weight:
Monobutyl Ether of Ethylene Glycol: 91.567
Normal Butanol: 32.503
Ethyl Acrylate: 14.453
Tertiary Butyl Perbenzoate: 0.026

In a separate vessel, the following are added and mixed:
Ethyl Acrylate: 54.764
Methacrylic Acid: 122.060
Styrene: 72.919
Normal Butanol: 2.050
Tertiary Butyl Perbenzoate: 2.351

The reactor is heated to reflux and the monomer mixture is added evenly to the refluxing reactor over a two-hour period. Then 7.932 parts of monobutyl ether of ethylene glycol are added as a rinse for monomer feed lines. Reflux is maintained for one hour, at which point 55.500 parts of normal butanol is added. Reflux temperatures are maintained for an additional hour at which point the heat is turned off and 72.623 parts of normal butanol are added, followed by 82.312 parts of dimethyl ethanol amine and 246.940 parts of deionized water. The product is a solution of a styrene/ethyl acrylate/methacrylic acid//27.6/26.2/46.2 polymer at 30.8% solids in solvent, water and amine. The acid number of the product is 300.

Into a suitably equipped kettle, inerted with nitrogen, are added the following parts by weight:
Monobutyl Ether of Ethylene Glycol: 8.400
"Epon 829": 86.978
Bisphenol A: 46.835

The kettle charge is heated to 130°–140° C., heat removed and allowed to exotherm to 175°–200° C. After the exotherm is exhausted, heat is applied and the reaction mass is maintained above 165° C. for two hours after peak exotherm. At this point, a sample can be removed for determination of completion of reaction. Theoretical epoxy equivalent weight is 3000. 6.655 Parts of monobutyl ether of ethylene glycol and 27.366 parts of normal butanol are added to dilute the reaction mass and cool it to 100° C.

121.131 Parts of the neutralized acrylic polymer prepared in (A) are added rapidly following by 23.181 parts of deionized water. The mass is heated to reflux temperature and held for twenty-five minutes. Heat is turned off and 288.155 parts of deionized water, preheated to 70°–80° C. is added evenly over a one-hour period. This dispersion may be isolated here at 28% solids. It may also be further diluted to 20% solids with 220.159 parts of deionized water and 23.288 parts of normal butanol to provide a ready-to-spray product at water/organic solvent of 80/20 by volume.

The resulting product contained about 77.8% epoxy resin and 22.2% acrylic resin, by weight, with an equivalent ratio of acid polymer/amine/epoxy of about 4.6/3.0/1.0. X was 3, and Y was 51.5.

EXAMPLE 4

Add to 100 grams of Example 3(B) 5.6 grams Cymel 373, partially alkylated melamine formaldehyde resin which is 85% solids in water plus 14.2 water and 3.1 grams normal butanol. This acts as an external crosslinker to aid in curing coated films.

COMPARATIVE TEST 1

Certain tests were performed to determine the relative merits of water-borne coating compositions of the invention with the minimum claimed level of an acid number of 100 and epoxy content of 50% versus comparable compositions outside the invention with an acid number of 65 and an epoxy content of 40%. Minor adjustments had to be made in the equivalent ratios of acid polymer/amine/epoxy in order to accommodate the difference in acid number and epoxy content.

(A)

Compositions of the invention were represented by the reaction product of 50% of an acid polymer with an acid number of 100 made of
styrene: 42.4
ethyl acrylate: 42.3
methacrylic acid: 15.3
and 50% of "Epon 1007" epoxy resin with an average epoxy equivalent weight of about 2175, analyzed at 2368. The acid polymer has been neutralized with enough dimethyl ethanol amine to give theoretical equivalent ratios of acid polymer/amine/epoxy of 3.87/3.87/1 and actual analyzed ratios of 4.21/4.21/1. X was 2.175; Y was 66.1.

(B)

Compositions outside the invention were represented by the reaction product of 60% of an acid polymer with an acid number of 65 made of
styrene: 45
ethyl acrylate: 45
methacrylic acid: 10
and 40% of "Epon 1007" epoxy resin. The reaction product was made in the same manner as in (A) above with enough dimethyl ethanol amine to give theoretical equivalent ratios of acid polymer/amine/epoxy of 3.79/3.79/1 and actual analyzed ratios of 4.13/4.13/1. X was 2.175, and Y was 51.1.

The compositions of (B) were significantly less stable than those of (A). (B) separated by settling in 2-3 weeks under ordinary laboratory conditions, while (A) remained well dispersed. Although (B) could be redispersed by stirring, this settling would be expected to be more severe under stress conditions such as freezing and thawing. Such a lack of stability undesirable and probably commercially unacceptable when a stable product is available.

COMPARATIVE TEST 2

By empirically testing a large number of different compositions, it has been determined that a relationship exists between the epoxy equivalent weight and the milliequivalents (MEQ) of amine-neutralized carboxylic acid polymer for obtaining a stable dispersion. This relationship is expressed by a curve wherein Y is $6+0.75(2^X)$, wherein Y is the milliequivalent of carboxyl groups neutralized with primary, secondary or tertiary amine or monofunctional quaternary ammonium hydroxide per 100 grams of acid polymer plus epoxy, and X is the epoxy equivalent weight divided by 1000. The curve represents the approximate locus of borderline stability. Above the curve, the compositions are stable if the other conditions of the invention are met including the acid number and the epoxy equivalent weight; below the curve, they are not. Although there is some flexibility in the precise location of the curve, it lies approximately where this definition puts it.

Data points of borderline stability have been determined as follows:

| X | Y |
|---|---|
| 0 | 6¾ |
| 1 | 7½ |
| 2 | 9 |
| 3 | 12 |

-continued

| X | Y |
|---|---|
| 4 | 18 |

What is claimed is:
1. A water-borne coating composition consisting essentially of liquid carrier and the reaction product of:
   (A) not less than 50% by weight, based on the weight of (A) plus (B), of an epoxy resin containing, on the average, two terminal 1,2-epoxy groups per molecule and having an epoxy equivalent weight of 750–5000;
   (B) a carboxyl-functional polymer in an amount sufficient to provide at least 1.25 equivalents of carboxyl groups, when the source of the carboxyl group is a mono-protic acid, and at least 2.0 equivalents of carboxyl groups, when the source of such groups is a diprotic acid, per equivalent of 1,2-epoxy groups in the epoxy resin, said polymer having a weight average molecular weight (determined by light scattering) of about 10000–160000 and an acid number of 100–500;
   (C) an aqueous solution of at least 1.25 equivalents of a tertiary amine per equivalent of 1,2-epoxy groups in the epoxy resin, said tertiary amine being selected from the group consisting of $R_1R_2R_3N$, pyridine, N-methylpyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms; and
   (D) optionally, 10–90% of the amount required for stoichiometric reaction with the carboxyl-functional polymer of (B) of at least one primary, secondary or tertiary amine or monofunctional quaternary ammonium hydroxide;
wherein Y is at least about $6+0.75(2^X)$ wherein Y is the milliequivalent of carboxyl groups neutralized with primary, secondary or tertiary amine or monofunctional quaternary ammonium hydroxide per 100 grams of acid polymer plus epoxy, and X is the epoxy equivalent weight divided by 1000; and wherein for increasing ratios of carboxyl groups to 1,2-epoxy groups, the amount of amine is increased to keep the carboxyl-functional polymer water dispersible.

2. The composition of claim 1 wherein components (A), (B) and (C) comprise about 0.1–50% by weight of the coating composition and the remainder is comprised of the liquid carrier which is water and, optionally, organic liquid in a volume ratio of from 70:30 to all water.

3. The composition of claim 2 wherein said carboxyl-functional polymer is present in an amount sufficient to provide at least 1.75 equivalents of carboxyl groups, when the source of the carboxyl group is a mono-protic acid, and at least 2.5 equivalents of carboxyl groups, when the source of such groups is a diprotic acid, per equivalent of 1,2-epoxy groups in the epoxy resin.

4. The composition of claim 2 wherein said carboxyl-functional polymer is present in an amount sufficient to provide no more than 6.0 equivalents of carboxyl groups per equivalent of 1,2-epoxy groups in the epoxy resin.

5. The composition of claim 2 wherein said epoxy resin has an epoxy equivalent weight of 1500–4000.

6. The composition of claim 2 wherein said carboxyl-functional polymer is a polymer of at least one $\alpha,\beta$-ethylenically unsaturated monomer and at least one $\alpha,\beta$-ethylenically unsaturated acid.

7. The composition of claim 6 wherein said $\alpha,\beta$-ethylenically unsaturated acid is represented by the structures:

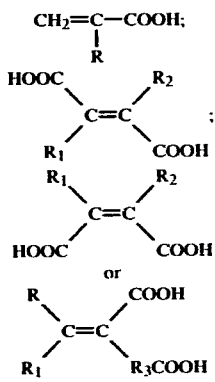

wherein R is hydrogen or an alkyl radical of 1–6 carbon atoms, $R_1$ and $R_2$ are hydrogen, an alkyl radical of 1–8 carbon atoms, halogen, cycloalkyl of 3–7 carbon atoms or phenyl, and $R_3$ is an alkylene radical of 1–6 carbon atoms; or half-esters thereof with alkanols of 1–8 carbon atoms.

8. The composition of claim 7 wherein said $\alpha,\beta$-ethylenically unsaturated acid is selected from the group consisting of acrylic acid, methacrylic acid, and itaconic acid.

9. The composition of claim 6 wherein said carboxyl-functional polymer has an acid number of 100–150.

10. The composition of claim 6 wherein said carboxyl-functional polymer has an acid number of 150–250.

11. The composition of claim 3 wherein said carboxyl-functional polymer is present in an amount sufficient to provide 1.5–2.5 equivalents of carboxyl groups per equivalent of 1,2-epoxy groups and said tertiary amine of (C) is present in the amount of 2.0–2.5 equivalents per equivalent of 1,2-epoxy groups.

12. The composition of claim 6 wherein said $\alpha,\beta$-ethylenically unsaturated monomer is selected from the group consisting of

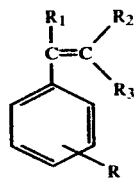 (a)

where R, $R_1$, $R_2$ and $R_3$ are hydrogen or an alkyl radical of 1–5 carbon atoms;

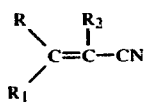 (b)

where R and $R_1$ are hydrogen, an alkyl radical of 1–18 carbon atoms, tolyl, benzyl or phenyl, and $R_2$ is hydrogen or methyl;

(c) esters of acrylic acid, methacrylic acid or mixtures thereof with alkanols of 1–16 carbon atoms;

(d) a mixture of up to 20% of said polymer, of hydroxyalkyl (meth)acrylate with at least one of (a), (b) and (c); and (e) a mixture of up to 20% of said polymer of (meth)acrylamide or N-alkoxymethyl (meth)acrylamide with at least one of (a), (b) and (c).

13. The composition of claim 12 wherein the $\alpha,\beta$-ethylenically unsaturated acid is selected from the group consisting of acrylic acid, methacrylic acid, and itaconic acid.

14. The composition of claim 13 wherein said carboxyl-functional polymer has the composition of styrene/acrylonitrile/$\alpha,\beta$-ethylenically unsaturated acid//45-84/10-30/15-54.

15. The composition of claim 13 wherein said carboxyl-functional polymer has the composition of styrene/acrylonitrile/alkyl (meth)acrylate/$\alpha,\beta$-ethylenically unsaturated acid//30-60/10-30/10-50/15-54.

16. The composition of claim 13 wherein said carboxyl-functional polymer has the composition of styrene/alkyl (meth)acrylate/$\alpha,\beta$-ethylenically unsaturated acid//20-70/10-60/15-54.

17. The composition of claim 13 wherein said carboxyl-functional polymer has the composition of methyl methacrylate/alkyl (meth)acrylate/$\alpha,\beta$-ethylenically unsaturated acid//20-40/30-74/15-54.

18. The composition of claim 1 wherein said epoxy resin is 50–90% by weight of (A) plus (B).

19. The composition of claim 2 wherein the tertiary amine of (C) $R_1R_2R_3N$ is selected from the group consisting of trimethyl amine, dimethyl ethanol amine, methyl diethanol amine, diethyl methyl amine, ethyl methyl ethanol amine, dimethyl benzyl amine, dimethyl propyl amine, dimethyl ethyl amine, dimethyl 3-hydroxy-1-propyl amine, dimethyl 2-hydroxy-1-propyl amine, dimethyl 1-hydroxy-2-propyl amine, and mixtures thereof.

20. The composition of claim 13 wherein the tertiary amine of (C) is dimethyl ethanol amine.

21. The composition of claim 1 consisting essentially of liquid carrier and the reaction product of:

(A) not less than 65% by weight, based on the weight of (A) plus (B), of an epoxy resin containing, on the average, two terminal 1,2-epoxy groups per molecule and having an epoxy equivalent weight of about 1500–4000;

(B) a carboxyl-functional polymer in an amount sufficient to provide at least about 1.75 equivalents of carboxyl groups, when the source of the carboxyl group is a mono-protic acid, and at least 2.0 equivalents of carboxyl groups, when the source of such groups is a diprotic acid, per equivalent of 1,2-epoxy groups in the epoxy resin, said polymer having a weight average molecular weight (determined by light scattering) of about 10000–80000 and an acid number of about 150–350;

(C) an aqueous solution of at least about 1.75 equivalents of a tertiary amine per equivalent of 1,2-epoxy groups in the epoxy resin, said tertiary amine being selected from the group consisting of $R_1R_2R_3N$, pyridine, N-methylpyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1-4 carbon atoms; and (D) optionally, 10-90% of the amount required for stoichiometric reaction with the carboxyl-functional polymer of (B) of at least one primary, secondary or tertiary amine or monofunctional quaternary ammonium hydroxide;

wherein Y is at least about $6+0.75(2^X)$ wherein Y is the milliequivalent of carboxyl groups neutralized with primary, secondary or tertiary amines or monofunctional quaternary ammonium hydroxide per 100 grams of acid polymer plus epoxy, and X is the epoxy equivalent weight divided by 1000; and wherein for increasing ratios of carboxyl groups to 1,2-epoxy groups, the amount of amine is increased to keep the carboxyl-functional polymer water dispersible.

22. The composition of claim 20 consisting essentially of liquid carrier and the reaction product of:
(A) about 78%, based on the weight of (A) plus (B), of an epoxy resin containing, on the average, two terminal 1,2-epoxy groups per molecule and having an epoxy equivalent weight of about 3000;
(B) a carboxyl-functional polymer in an amount sufficient to provide at least about 4.6 equivalents of carboxyl groups, when the source of the carboxyl group is a mono-protic acid, and at least 2.0 equivalents of carboxyl groups, when the source of such groups is a diprotic acid, per equivalent of 1,2-epoxy groups in the epoxy resin, said polymer having a weight average molecular weight (determined by light scattering) of about 13000-18000 and an acid number of about 300;
(C) an aqueous solution of at least about 3.0 equivalents of a dimethyl amino ethanol per equivalent of 1,2-epoxy groups in the epoxy resin; and
(D) optionally, 10-90% of the amount required for stoichiometric reaction with the carboxyl-functional polymer of (B) of at least one primary, secondary or tertiary amine or monofunctional quaternary ammonium hydroxide;

wherein Y is at least about $6+0.75(2^X)$ wherein Y is the milliequivalent of carboxyl groups neutralized by primary, secondary or tertiary amine or monofunctional quaternary ammonium hydroxide per 100 grams of acid polymer plus epoxy, and X is the epoxy equivalent weight divided by 1000; and wherein for increasing ratios of carboxyl groups to 1,2-epoxy groups, the amount of amine is increased to keep the carboxyl-functional polymer water dispersible.

23. The composition of claim 1, 2, 6, 8, 11, 12, 14, 15, 16, 17, 20, 21 or 22, additionally containing a crosslinking agent which is at least one of phenol formaldehyde and a nitrogen resin.

24. A water-borne coating composition consisting essentially of liquid carrier and the reaction product of:
(A) 50-90%, based on the weight of (A) plus (B), of an epoxy resin containing, on the average, two terminal 1,2-epoxy groups per molecule and having an epoxy equivalent weight of 875-2500;
(B) a carboxyl-functional polymer in an amount sufficient to provide about 2.5 equivalents of carboxyl groups per equivalent of 1,2-epoxy groups in the epoxy resin, wherein said polymer has a composition of styrene/acrylonitrile/itaconic acid//45-84/10-30/11.5-17.4, a weight average molecular weight (determined by light scattering) of 60,000-100,000 and an acid number of 100-150; and
(C) an aqueous solution of about 2.5 equivalents of dimethyl ethanol amine per equivalent of 1,2-epoxy groups in the epoxy resin;
wherein components (A), (B) and (C) comprise about 0.1-50% by weight of the coating composition and the remainder is comprised of water and organic liquid(s) in a volume ratio from 70:30 to 90:10.

25. The composition of claim 24 wherein said polymer has a composition of styrene/acrylonitrile/itaconic acid//about 66/about 20/about 14.

26. The composition of claim 25 additionally containing diethoxytetramethoxymethylmelamine.

27. A water-borne coating composition consisting essentially of liquid carrier and the reaction product of:
(A) 50-90%, based on the weight of (A) plus (B), of an epoxy resin containing, on the average, two terminal 1,2-epoxy groups per molecule and having an epoxy equivalent weight of 875-2500;
(B) a carboxyl-functional polymer in an amount sufficient to provide about 2.5 equivalents of carboxyl groups per equivalent of 1,2-epoxy groups in the epoxy resin, wherein said polymer has a composition of styrene/ethyl acrylate/methacrylic acid//20-70/10-60/15.3-23, a weight average molecular weight (determined by light scattering) of 60,000-100,000 and an acid number of 100-150; and
(C) an aqueous solution of about 2.5 equivalents of dimethyl ethanol amine per equivalent of 1,2-epoxy groups in the epoxy resin;
wherein components (A), (B) and (C) comprise about 0.1-50% of the coating composition and the remainder is comprised of water and organic liquid(s) in a volume ratio from 70:30 to 90:10.

28. The composition of claim 27 wherein said polymer has a composition of styrene/ethyl acrylate/methacrylic acid//about 42/about 40/about 18.

29. The composition of claim 28 additionally containing diethoxytetramethoxymethylmelamine.

30. A water-borne coating composition consisting essentially of liquid carrier and the reaction product of:
(A) 50-90%, based on the weight of (A) and (B), of an epoxy resin containing, on the average, two terminal 1,2-epoxy groups per molecule and having an epoxy equivalent weight of 875-2500;
(B) a carboxyl-functional polymer in an amount sufficient to provide about 2.0 equivalents of carboxyl groups per equivalent of 1,2-epoxy groups in the epoxy resin, wherein said polymer has a composition of methyl methacrylate/ethyl acrylate/acrylic acid/N-isobutoxymethyl (meth)acrylamide//20-40/30-74/12.8-19.3/0-20, a weight average molecular weight (determined by light scattering) of 60,000-100,000 and an acid number of 100-150; and
(C) an aqueous solution of about 2.0 equivalents of dimethyl ethanol amine per equivalent of 1,2-epoxy groups in the epoxy resin;
wherein components (A), (B) and (C) comprise about 0.1-50% of the coating composition and the remainder is comprised of water and an organic liquid(s) in a volume ratio from 70:30 to 90:10.

31. An article coated with a cured coating based on the composition of claim 1.

32. An article coated with a cured coating based on the composition of claim 1 additionally containing a nitrogen resin crosslinking agent.

33. A coating compression of claim 1, 20, 21, 24, 27 or 30 wherein components (A), (B) and (C) are capable of forming a hydrogel structure.

34. A method of making the composition of claim 1 wherein a first solution is made by dissolving the epoxy resin of (A) and the carboxyl-functional polymer of (B) in an organic liquid, then the tertiary amine of (C) is added to the first solution, to make a second solution, then water is mixed with the second solution, if needed, to achieve a volume ratio of water to organic liquid between 70:30 and 90:10.

35. A method of making the composition of claim 1 wherein a first solution is made by dissolving the epoxy resin of (A) in an organic liquid, then the tertiary amine of (C) is added to the first solution to form a polymeric quaternary ammonium hydroxide in an organic liquid, then the carboxyl-functional polymer of (B), dissolved in an organic liquid, is mixed with the polymeric quaternary ammonium hydroxide with agitation to form a second solution, then water is mixed with the second solution, if needed, to achieve a weight ratio of water to organic liquid between 70:30 and 90:10.

36. The method of claim 35 wherein the carboxyl-functional polymer of (B) is pre-reacted to 10–90% of stoichiometry with at least one primary, secondary or tertiary amine or monofunctional quaternary ammonium hydroxide (D) before being mixed with the polymeric quaternary ammonium hydroxide.

37. A method of making the composition of claim 1 wherein a first solution is made by dissolving the carboxyl-functional polymer of (B) in an organic liquid, then an aqueous solution of a tertiary amine of (C) is mixed with the first solution to form a second solution, then the epoxy resin of (A) is mixed with the second solution to form a third solution, then water is mixed with the third solution, if needed, to achieve a volume ratio of water to organic liquid between 70:30 and 90:10.

38. The method of claim 34, 35, 36 or 37 wherein the resulting mixture of (A), (B) and (C) is heated between 50° and 95° C. to react (A), (B) and (C).

39. The method of claim 34, 35, 36 or 37 wherein the resulting mixture of (A), (B) and (C) is heated between 70° and 80° C. to react (A), (B) and (C).

40. The method of claim 34, 35 or 37 wherein the mixed ingredients of said claim are allowed to react to produce a reaction product and then at least one primary, secondary or tertiary amine or monofunctional quaternary ammonium hydroxide of (D) is mixed with the reaction product.

41. The composition of claim 1 wherein the liquid carrier is water and organic liquid in a volume ratio of about 80:20.

* * * * *

UNITED STATES PATENT OFFICE
CERTIFICATE OF CORRECTION

PATENT NO. : 4,247,439
DATED : January 27, 1981
INVENTOR(S) : James F. Matthews & Eugene G. Sommerfeld It is certified that error appears in the above-identified patent and that said Letters Patent are hereby corrected as shown below:

Column 21, line 1;  "compression" should read -- composition --.

Signed and Sealed this

Twentieth Day of July 1982

[SEAL]

Attest:

GERALD J. MOSSINGHOFF

Attesting Officer   Commissioner of Patents and Trademarks